United States Patent
Jin et al.

(10) Patent No.: US 11,894,031 B1
(45) Date of Patent: Feb. 6, 2024

(54) SELF-ALIGNED HYBRID NEAR FIELD TRANSDUCER WITH SINGLE PEG GRAIN

(71) Applicants: Headway Technologies, Inc., Milpitas, CA (US); SAE Technologies Development (Dongguan) Co., Ltd., Dongguan (CN); SAE Magnetics (Hong Kong) Limited, Shatin (HK)

(72) Inventors: Xuhui Jin, Sunnyvale, CA (US); Pengbo Yang, Dongguan (CN); Koji Shimazawa, Cupertino, CA (US); Hong Guo, Fremont, CA (US); Qinghui Guo, Dongguan (CN); Vincent Man Fat Chiah, Shatin (HK)

(73) Assignees: Headway Technologies, Inc., Milpitas, CA (US); SAE Technologies Development (Dongguan) Co., Ltd., Dongguan (CN); SAE Magnetics (Hong Kong) Limited, Shatin (HK)

( * ) Notice: Subject to any disclaimer, the term of this patent is extended or adjusted under 35 U.S.C. 154(b) by 0 days.

(21) Appl. No.: 18/091,809

(22) Filed: Dec. 30, 2022

(51) Int. Cl.
| | |
|---|---|
| *G09G 3/32* | (2016.01) |
| *G11B 5/60* | (2006.01) |
| *G11B 5/31* | (2006.01) |
| *G11B 5/48* | (2006.01) |
| *G11B 13/08* | (2006.01) |
| *G11B 5/00* | (2006.01) |

(52) U.S. Cl.
CPC ............ *G11B 5/6088* (2013.01); *G11B 5/314* (2013.01); *G11B 5/4866* (2013.01); *G11B 13/08* (2013.01); *G11B 2005/0021* (2013.01)

(58) Field of Classification Search
CPC ..... G11B 5/6088; G11B 5/314; G11B 5/4866; G11B 13/08; G11B 2005/0021
See application file for complete search history.

(56) References Cited

U.S. PATENT DOCUMENTS

| | | | |
|---|---|---|---|
| 8,000,178 B2 | 8/2011 | Shimazawa et al. | |
| 8,395,974 B1 | 3/2013 | Shimazawa et al. | |
| 10,283,151 B1* | 5/2019 | Wessel | H01S 5/02407 |
| 10,515,658 B1* | 12/2019 | Mader | G11B 13/045 |
| 2014/0233361 A1 | 8/2014 | Shimazawa | |
| 2015/0170675 A1 | 6/2015 | Shimazawa et al. | |
| 2017/0221505 A1 | 8/2017 | Staffaroni et al. | |
| 2019/0066719 A1* | 2/2019 | Macken | G11B 5/3106 |
| 2020/0098391 A1* | 3/2020 | Goggin | G11B 5/4866 |

\* cited by examiner

*Primary Examiner* — Andrew Sasinowski

(74) *Attorney, Agent, or Firm* — DLA Piper LLP (US)

(57) ABSTRACT

A near field transducer (NFT) having improved reliability is disclosed. In some embodiments, a NFT includes a resonator body layer having a front side at a first plane that is recessed a first distance from an air bearing surface (ABS), and a peg layer that is a single layer made of a noble metal or alloy thereof. The peg layer includes a peg portion or peg with a front side at the ABS, a back side at the first plane, and two sides aligned orthogonal to the ABS and separated by the first cross-track width. The peg portion or the peg having a single peg grain with or without a desired (111) orientation through laser self-annealing process.

20 Claims, 2 Drawing Sheets

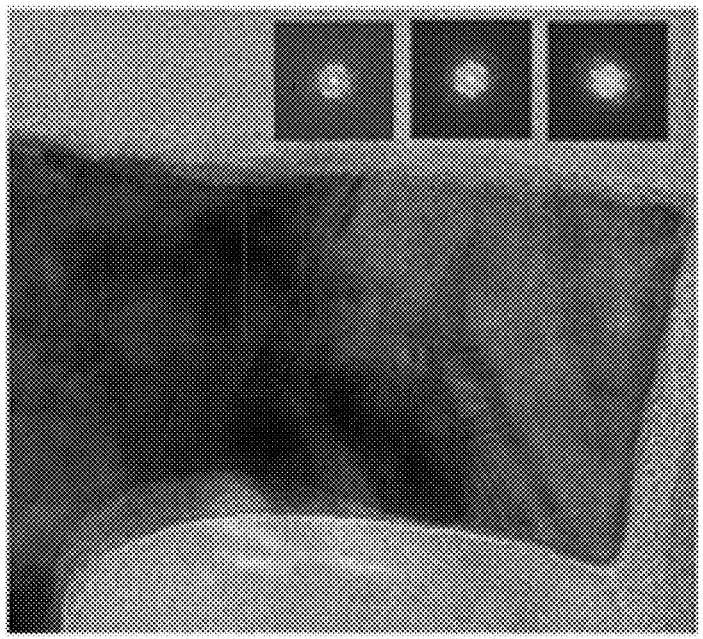
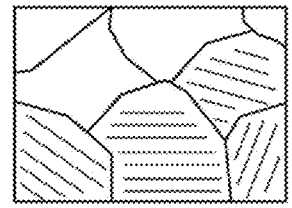
FIG. 3A
FIG. 3B
FIG. 3C
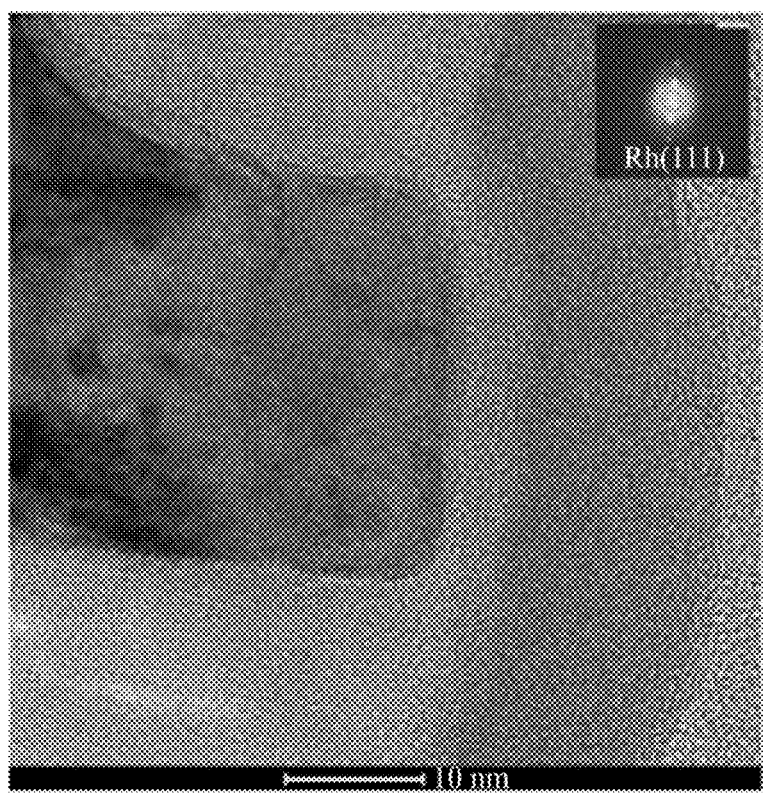
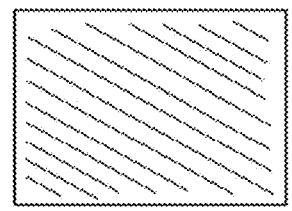
FIG. 4A
FIG. 4B
FIG. 4C

SELF-ALIGNED HYBRID NEAR FIELD TRANSDUCER WITH SINGLE PEG GRAIN

TECHNICAL FIELD

Embodiments of the present disclosure relate generally to a thermally assisted magnetic recording (TAMR) device, and in particular to a near field transducer (NFT) structure wherein a peg portion has improved thermo-mechanical stability.

BACKGROUND

TAMR involves raising the temperature of a small region of the magnetic medium to near its Curie temperature where its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, data storage density in a hard disk drive (HDD) in terms of kTPI (thousands of tracks per inch) can be further improved.

Optical power is delivered to the NFT by means of a dielectric waveguide where light from the waveguide is coupled into a NFT resonant mode, and specifically to a substantial portion of the NFT called the resonator body. Then, the NFT resonant mode is coupled to a small portion of the magnetic medium to generate a heating spot through a NFT peg feature, hereinafter referred to as the peg that has one end near the air bearing surface (ABS). The peg down-track and cross-track dimensions at the ABS largely dictate optical power intensity on the magnetic recording layer. Waveguide light typically originates from a diode mounted on the back side of a slider and has a wavelength of about 808 nm. The light may be in a transverse electric (TE) or transverse magnetic (TM) mode.

A critical requirement for proper TAMR operation is that the integrity of the peg must not be compromised since even a subtle peg shape change can cause a drastic drop in TAMR performance. The peg after wafer process in general has multiple small grains with random polycrystalline microstructure. During a TAMR writing operation with laser, the peg will experience very high temperatures up to 300-400° C. The small peg grains are not energetically stable at such high temperature and the grains will aggregate, merge, and form large grains by eliminating grain boundaries. Peg recession from ABS often occurs as a result of vacancy release from grain boundaries. This grain growth and recrystallization process occurs in an uncontrollable manner and can make substantial changes on the peg that cannot be reversed in drive operation.

Therefore, a new NFT structure is needed to provide peg shape integrity while maintaining acceptable optical properties and optical efficiency.

SUMMARY

Broadly, embodiments of the present disclosure provide a NFT structure having a NFT resonator body and a peg portion that enable efficient excitation of surface plasmon through the mode beating between NFT and waveguide light and improved thermo-mechanical properties in a TAMR device, as well as a method of forming the NFT structure that can be fabricated with excellent process control.

According to some embodiments of the present disclosure, a near field transducer (NFT) formed between a main pole layer and a waveguide in a thermally assisted magnetic recording (TAMR) head wherein waveguide light excites surface plasmon on the NFT that propagates to an air bearing surface (ABS) and is coupled to a magnetic medium to facilitate a write process, the NFT comprises: (a) a resonator body layer made of a first metal or alloy with a plasmonic character and having a first thickness (t1) in a down-track direction wherein the surface plasmon mode is excited, the resonator body layer has a front side that is recessed a first distance from the ABS; and (b) a peg layer having a second thickness (t2) in a down-track direction wherefrom the surface plasmon is coupled to the magnetic medium, the peg layer is a single layer comprising a single material that is a noble metal or alloy thereof and is different from the first metal or alloy and comprises: a peg portion or peg with a front side at the ABS, the peg portion or the peg having a single peg grain with or without a desired (111) orientation, a back side at the first plane, and two sides aligned orthogonal to the ABS and separated by the first cross-track width.

According to some embodiments of the present disclosure, the first cross-track width of the peg is from about 10 to 50 nm.

According to some embodiments of the present disclosure, the first distance is from about to 40 nm.

According to some embodiments of the present disclosure, the first thickness is a down-track thickness of about 30-70 nm, and the second thickness is a down-track thickness of about nm.

According to some embodiments of the present disclosure, the resonator body layer is a metal that is Au, Ag, Cu, or an alloy thereof.

According to some embodiments of the present disclosure, the peg layer is a noble metal that is Rh, Ir, Ru, Pd, Pt, or an alloy thereof.

According to some embodiments of the present disclosure, the resonator body layer further includes a back side with a second cross-track width greater than the first cross-track width at a second plane formed parallel to the ABS and first plane, and two sides connecting the front and back sides wherein the two sides are separated by an increasing cross-track distance with increasing distance from the first plane to the back side.

According to some embodiments of the present disclosure, the peg layer further includes a back portion of the peg layer having a front side with the first cross-track width and adjoining the peg at the first plane; a back side having the second cross-track width at the second plane, and two sides connecting the front and back sides, the two sides of the back peg layer portion are aligned above the two resonator body layer sides in a self-aligned NFT structure having a thickness (t1+t2) between a top surface of the peg layer and a bottom surface of the resonator body layer wherein the top surface of the peg layer faces a leading side of the main pole layer, and the bottom surface of the resonator body layer faces the waveguide, and wherein the peg layer top surface is a planar surface formed on the back portion and on the peg portion A thermally assisted magnetic recording (TAMR) head is also disclosed herein. According to some embodiments of the present disclosure, the TAMR wherein waveguide light excites surface plasmon in a near field transducer (NFT) that propagates to an air bearing surface (ABS) and is coupled to a magnetic medium to facilitate a write process, comprises: (a) a main pole layer having a front side at the ABS and a bottom surface that is a leading side during the write process; (b) a waveguide having a top surface facing the main pole layer and wherein light from a laser diode is propagated toward the ABS, and with a front side that faces the ABS; (c) the near field transducer that is formed between the main pole layer and the waveguide at the ABS; (d) a blocker comprising a metal formed between a front side of the waveguide and the ABS, the blocker prevents waveguide light not coupled to the NFT from reaching the ABS, wherein the blocker has a back side with a maximum distance from the ABS that is less than a distance of the front side of the waveguide from the ABS; and (e) a dielectric layer between the blocker back side and the waveguide front side.

According to some embodiments of the present disclosure, the self-aligned NFT structure further comprises a first adhesion layer having a bottom surface contacting a top surface of the resonator body layer, and a top surface adjoining a bottom surface of the peg layer, the first adhesion layer has a shape from a top-down (down-track) view essentially the same as that of the overlying peg layer such that a front end of a first section at the ABS has the first cross-track width, and a back end of a second section at the second plane has the second cross-track width.

According to some embodiments of the present disclosure, the first cross-track width of the peg is from about 10 to 50 nm.

According to some embodiments of the present disclosure, the first distance is from about to 40 nm.

According to some embodiments of the present disclosure, the first thickness is a down-track thickness of about 30-70 nm, and the second thickness is a down-track thickness of about nm.

According to some embodiments of the present disclosure, the resonator body layer is a metal that is Au, Ag, Cu, or an alloy thereof.

According to some embodiments of the present disclosure, the peg layer is a noble metal that is Rh, Ir, Ru, Pd, Pt, or an alloy thereof.

According to some embodiments of the present disclosure, the blocker is made of Rh, TiN, Ru, NiFe, or FeCo.

Also disclosed herein is a method of fabricating the near field transducer in the TAMR head. According to some embodiments of the present disclosure, the method includes: providing a near field transducer in a TAMR head; determining the effective current Ieff at 100% for optimal ADC performance of the TAMR head on a spin stand with a TAMR disk, PMR disk, or glass disk; and self-annealing the peg portion or peg by applying an overdriven Ieff in the range of 120% to 210% for 0.1 to 60 seconds to the peg at passive flight to form a single peg grain with the desired (111) orientation.

According to some embodiments of the present disclosure, the method further comprises confirming ADC performance of the TAMR head after self-annealing the peg.

According to some embodiments of the present disclosure, self-annealing includes a smart laser self-annealing process (SLSA).

According to some embodiments of the present disclosure, providing the near field transducer in the TAMR head includes: (a) forming the waveguide on a bottom cladding layer, and facing the blocker having a front side at the air bearing surface (ABS) and a back side adjoining a first gap layer that separates the blocker and waveguide; (b) sequentially depositing a first adhesion layer and the resonator body layer portion of the near field transducer (NFT) on the first gap layer and waveguide; (c) patterning the resonator body layer to form the front side thereof that is recessed the first distance from the ABS; (d) sequentially forming a second adhesion layer, the peg layer portion of the NFT, and then a hard mask comprising a lower carbon layer and an upper first hard mask layer on the resonator body layer and a surrounding oxide layer; (e) patterning the first hard mask to form a rectangular shape having a first cross-track width that will define a first cross-track width in a peg portion of the NFT peg layer in a later step; (f) patterning a second hard mask on the first hard mask, the second hard mask pattern defines a top-down shape that is subsequently etch transferred into the peg layer portion, second adhesion layer, and resonator body layer, the top-down shape has a back side formed parallel to the ABS, and two sides separated by a greater cross-track distance with increasing distance from the ABS; (g) performing a first reactive ion etch to remove unprotected portions of the carbon hard mask, and then an ion beam etch to remove unprotected portions of the second adhesion layer and resonator body layer, and thereby defining the sides of the peg layer, second adhesion layer, and resonator body layer in a self-aligned process, and removing the remaining portions of the first and second hard masks; and (h) performing a second reactive ion etch to remove the remaining portion of carbon hard mask.

BRIEF DESCRIPTION OF THE DRAWINGS

The accompanying drawings, which are incorporated in and constitute a part of this specification, exemplify various embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not generally drawn to scale.

FIG. 3A-C shows a conventional peg of a NFT with multiple grains and poor grain orientation. FIG. 3A is an x-sec TEM including diffraction patterns showing poor grain orientation at several peg locations. FIG. 3B is a schematic view of the conventional peg having multiple small Rh peg grains with random out-of-plane grain orientation. FIG. 3C is a schematic view of the conventional peg having multiple small Rh peg grains with random in-plane grain orientation.

FIG. 4A-C shows a peg of a self-aligned hybrid NFT after self-annealing the peg by SLSA with 138% effective current Ieff for 10 seconds according to some embodiments of the present disclosure. FIG. 4A is an x-sec TEM including diffraction patterns showing a single grain at the peg location with the desired Rh (111) orientation. FIG. 4B is a schematic view of a single Rh peg grain with the desired (111) out-of-plane grain orientation. FIG. 4C is a schematic view of a single Rh peg grain with the desired (111) in-plane grain orientation.

DETAILED DESCRIPTION

The present disclosure provides a self-aligned hybrid near field transducer (NFT) with a resonator body layer and peg layer wherein a peg portion has improved reliability by way of enhanced thermo-mechanical properties through a smart laser self-annealing process compared with conventional NFTs. In all drawings, the y-axis is the cross-track direction, the z-axis is the down-track direction, and the x-axis is a direction orthogonal to the air bearing surface (ABS) and towards a back end of the device. Top surface indicates a side of a layer that faces the main pole while a front end or front side relates to a surface of a layer at or facing the ABS. The term "sidewall" indicates a side of a layer that is aligned substantially in a down-track direction. The self-aligned hybrid NFT is incorporated in a TAMR write head that may be part of a merged read head/write head design as appreciated by those skilled in the art. TAMR is also known in the art as heat assisted magnetic recording (HAMR).

Figure 1:
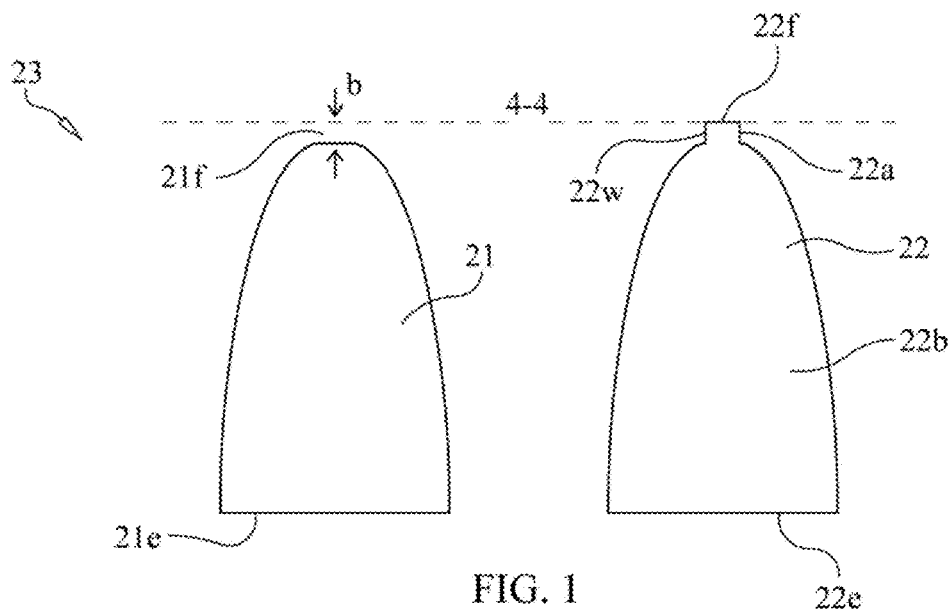
FIG. 1 show top-down views of a NFT resonator body layer (e.g., made of Au) and a NFT peg layer (e.g., made of Rh), respectively, in a self-aligned hybrid NFT formed according to some embodiments of the present disclosure.

Referring to FIG. 1, top-down views of a NFT resonator body layer 21 (e.g., made of Au) and NFT peg layer 22 (e.g., made of Rh) of a self-aligned hybrid NFT 20, respectively, are shown according to some embodiments of the present disclosure. A center plane is aligned orthogonal to ABS 4-4 and bisects NFT layers 21, 22 such that the sides, respectively, are equidistant from the center plane. There is greater cross-track separation between the sides with increasing distance from the ABS. Moreover, sides of the NFT peg layer 22 are aligned above sides of the NFT resonator body layer 21 such that the back ends have the same cross-sectional width, and a lengthwise dimension of the resonator body layer 21 between a front side and a back side is essentially equivalent to a lengthwise dimension of the back portion 22b of the peg layer 22. Thus, in the assembled NFT structure, the peg layer 22 is directly above a top surface of the resonator body layer 21.

In some embodiments, the NFT resonator body layer 21 comprises Au, Ag, Cu, or alloys thereof and may be constructed to have a wetting angle compliant shape such that the resonator body layer and peg layer do not deform at elevated temperatures during write operations. In some embodiments, the NFT resonator body layer 21 comprises Au as shown in FIG. 1 for exemplary purposes. In some embodiments, the resonator body layer has a wetting angle compliant shape defined by a wetting angle formed by a metal in the resonator body layer and a metal oxide in the oxide layer that adjoins the sides of the resonator body layer proximate to a front side of the resonator body layer.

In some embodiments, as shown in FIG. 1, the peg layer 22 and other overlying layers are removed in order to clearly show the top-down shape of layer 21. In other embodiments (not shown), the sides may form a substantially triangular shape, respectively.

In some embodiments, as shown in FIG. 1, peg 22a is the front section of the peg layer 22 and is shown with a front side 22f at the ABS 4-4, sides 22w aligned orthogonal to the ABS, and a back side that is parallel to the ABS. The peg length in the x-axis direction is from 10-40 nm, and preferably 20-30 nm, and the recessed distance (step length b) of resonator body layer front side 21f from the ABS is from 15-35 nm. The grain quality of peg layer depends on the grain microstructure of resonator body layer. In general, the Au resonator layer grows in (111) orientation during wafer process, and the portion of the peg layer directly on the top of the resonator body also grows in (111) orientation by using the Au resonator layer as the template. However, the peg portion grows on the top of dielectric in front of the recessed resonator, and the grain orientation generally is random after wafer process. The recessed distance of the resonator body in the x-axis direction is desired to be no greater than 35 nm such that the peg 22a has a much higher chance to grow into a single grain with the desired (111) orientation during a self-annealing process by following the grain microstructure of the other portion of the peg layer. The peg length in the x-axis direction is also no less than 15 nm to avoid ADC performance loss.

The peg cross-track width is dependent on the track density and is preferably 30-50 nm for kTPI targets from 400 kTPI up to 600 kTPI. As HDD track density increases to 800 kTPI, for example, peg cross-track width is scaled down to less than 30 nm. In some embodiments, the peg cross-track width may have a minimum value of about 10 nm. In some embodiments, the peg layer comprises a noble metal or alloy, such as at least one of Rh, Ir, Ru, Pd, Pt, RhIr, RhPt, and PtIr. In some embodiments, the peg layer comprises Rh as shown for exemplary purposes in FIG. 1.

As shown in FIGS. 3A-C, conventional pegs after wafer process in general have multiple small grains with random polycrystalline microstructure, i.e., poor grain orientation. Conventional pegs are greatly deformed after long time stress with laser and they are unable to maintain initial ADC performance due to changes in peg shape, size, and/or material property.

In contrast, as shown in FIGS. 4A-C for exemplary purposes, the peg 22a has a single grain (e.g., single Rh peg grain) with the desired (111) orientation (e.g., Rh (111) orientation). Without being bound to any particular theory, the peg 22a having a single grain with the desired (111) crystalline orientation is more stable than multiple grains with vacancies in the grain boundary.

In some embodiments, the peg 22a is formed with a single grain with the desired (111) orientation by first determining the effective current Ieff at 100% (defined as the maximum laser diode current—threshold current) for optimal areal density capability (ADC) performance under typical TAMR writing conditions when testing the TAMR head on a spin stand with a TAMR disk with optimized heater and writer current. In Ieff optimization process (to determine the effective Ieff at 100%), recording is first performed using very small laser current values, and the recording width is evaluated. After that, the current value is gradually increased until a recording width for satisfying the target track pitch (=TPI) is obtained. The recording width becomes wider as the current value increases. Here, the TPI target has a certain width, not a "pin-point" value. BPI (bits per inch) dependency on SNR (signal-to-noise ratio) is also measured at each TPI within that range to determine the current that yields the maximum ADC (=TPI×BPI). The current value at this time is defined as 100% Ieff No larger current is applied in actual use. Below its threshold current, a diode laser emits LED light with spontaneous emission only. At the threshold current and above, it begins to generate laser light, and the optical output power rises steeply with increasing diode operating current. The correlation between the optical output power and the diode current is linear up to the maximum power.

In some embodiments, the effective current Ieff under normal operation (100%) includes optimizing both TPI and BPI for optimal ADC performance in spin stand. The term areal density capability (ADC) may refer to a product of a number of data tracks on a disc (e.g., tracks per inch (TPI)) and a number of data bits along each data rack (e.g., bits per inch (BPI)). TPI and BPI values selected to achieve a high or optimal ADC while maintaining an acceptable bit error rate (BER). If the BER becomes too high, storage device performance may suffer as error correction and read retry operations are performed.

In some embodiments, after determining the effective current Ieff (100%) for optimal areal density capability (ADC) performance under typical TAMR writing conditions, self-annealing is performed by applying an overdriven Ieff in the range of 120% to 210% with duration from 0.1 to 60 seconds to the peg 22a at passive flight by turning off heater and writer current. Without being bound by any particular theory, by increasing Ieff to a higher level (120% to 210%) from the operation Ieff (100%) normally used in TAMR writing, the peg 22a (e.g., an Rh peg) can reach a much higher temperature, such as 400-700° C., than the temperature (300-400° C.) normally reached during TAMR writing. This temperature range allows for peg grain growth and recrystallization to occur quickly (e.g., 0.1 to 60 seconds) to form a single peg (Rh) grain with the desired (111) orientation. For example, by precisely controlling temperature by overdriving Ieff to 138% and self-annealing for 10 seconds, a single peg (Rh) grain with the desired (111) orientation can be formed as shown in FIG. 3B.

In some embodiments, self-annealing is performed by applying an overdriven Ieff at 120% for 10 to 60 seconds. In some embodiments, self-annealing is performed by applying an overdriven Ieff at 130% for 5 to 30 seconds. In some embodiments, self-annealing is performed by applying an overdriven Ieff at 150% for 0.1 to 10 seconds. No subsequent writing process with laser power cycling (e.g., cycling through high and low laser power) is required to form the single peg (Rh) grain with the desired (111) orientation can be formed as shown in FIG. 3B. In some embodiments, self-annealing as described herein only needs to be performed once to form the single peg (Rh) grain with the desired (111) orientation as shown in FIG. 3B.

In some embodiments, self-annealing is a smart laser self-annealing process (SLSA). Self-annealing by SLSA allows for heating to be locally confined to the peg region and all other regions would have a much lower temperature than the peg 22a, thereby pre-conditioning the peg 22a to form a single (Rh) peg grain with the desired (111) orientation for enhanced reliability. More specifically, no main pole (MP) corrosion and no bottom resonator body layer (e.g., Au) recession are observed in a SLSA process even under stressful conditions like 175% Ieff +10 minutes as confirmed by ABS SEM and x-sec TEM, thereby confirming that heat is locally confined to the peg region during self-annealing by SLSA.

The overdriven Ieff applied is preferably not over 210% in which peg temperature could be overdriven to more than 700° C. Peg deformation (rounding and/or recession) occurs very quickly, which indicates drastic peg grain growth and fast recrystallization under such high temperature. As such, it is difficult to control peg grain growth precisely under very high temperatures and short time durations in spin stand. By lowering Ieff to 120% from 210%, peg grain growth (such as Rh peg grain growth) can be well-controlled without peg deformation.

The self-aligned hybrid NFT provided herein fulfills a critical requirement for a reliable NFT structure in that the peg shape does not undergo any changes after fabrication so that performance during repeated operation is not degraded.

Figure 2:
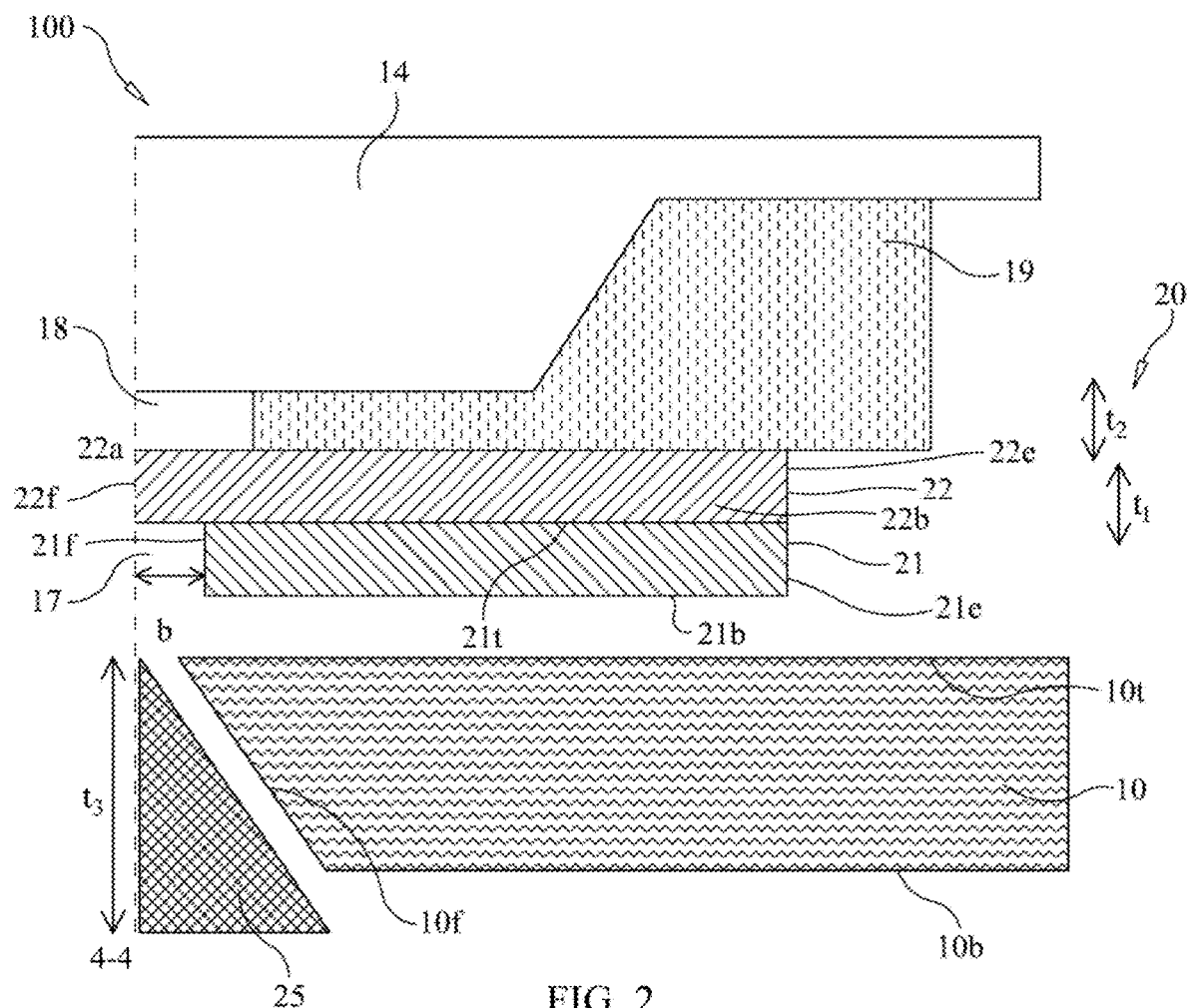
FIG. 2 is a cross-sectional view according to some embodiments of the present disclosure where the self-aligned hybrid NFT in FIGS. 1(a) and 1(b) is incorporated in a TAMR write head.

FIG. 2 shows a self-aligned hybrid NFT 20 according to some embodiments of the present disclosure between waveguide 10 and main pole 14 of a TAMR head 100 in a cross-sectional view. It should be understood that the main pole and waveguide may have shapes different from those depicted although the main pole always has a front side at the ABS 4-4. However, a key feature is that the NFT 20 has a resonator body layer 21 with a planar top surface 21t adjoining a bottom surface of peg layer 22b, and a planar bottom surface 21b facing a top surface 10t of the waveguide 10. Note that the term waveguide may be used interchangeably with "waveguide core" when describing embodiments of the present disclosure. Furthermore, a top surface of the peg 22a and back portion of the peg layer is planar and faces a bottom surface of the main pole. There is a first gap layer 17 comprising a dielectric material with a low refractive index at the ABS and extending to adjoin a front side of the resonator body layer. A second gap layer 18 is formed between the peg layer and main pole and extends from the ABS. Each of the gap layers may be made of alumina, silicon oxide, silicon oxynitride (SiON), or $MgF_2$, for example, to optimize the transmission of the surface plasmon (resonant) mode on the NFT, and especially along sidewalls (not shown) of the resonator body layer and along peg 22a surfaces. In some embodiments, resonator body layer thickness t1 is from 30 to 50 nm, and peg layer thickness t2 is about 35 to 55 nm.

Waveguide core 10 is formed on a bottom cladding layer and a portion thereof extends upward between the blocker back side and waveguide front side until it is coplanar with a waveguide top surface. A top cladding layer is formed above a top surface of the waveguide core Above the top cladding layer and adjoining the bottom surfaces of the first gap layer 17 and resonator body layer 21 is an optional adhesion layer.

Light is generated by a laser diode (not shown) mounted on the back end of the slider on which the TAMR head 100 is formed, and is propagated toward the ABS within waveguide 10. A substantial portion of waveguide light is coupled to NFT resonator body 21 through the mechanism of mode beating that excites surface plasmon propagating to peg 22a, and then is coupled to a heating spot on a magnetic medium (not shown) proximate to the ABS 4-4 thereby facilitating a write process involving a magnetic bit proximate to the heating spot. The remaining waveguide light and a portion along the waveguide bottom are not coupled to the NFT and continue to propagate toward the ABS. The front side 10f of the waveguide may be sloped with respect to the ABS such that a front end of top surface 10t is closer to the ABS than a front end of bottom surface 10b. In other embodiments, the waveguide front side may be formed essentially parallel to the ABS 4-4.

In some embodiments, a blocker 25 is formed between a front side 10f of the waveguide and the ABS 4-4 to reflect light toward a back end of the TAMR head thereby preventing unwanted heating of the magnetic medium outside the magnetic bit to be written to. The blocker has a down-track thickness t3 greater than that of waveguide 10, and a cross-track width greater than that of the waveguide 10. In some embodiments, the blocker is a metal or alloy such as Rh, TiN, Ru, NiFe, FeCo, or the like. In some embodiments, the blocker may be a laminated structure comprising one or more of $Ta_2O_5$, alumina, or other dielectric materials. A front side 25f of the blocker may abut the ABS 4-4. In some embodiments, the blocker has a triangular shape from a cross-track view with a sloped back side facing the waveguide.

In some embodiments, the TAMR head 100 may also include a bottom heat sink 19 contacting a bottom surface of main pole 14 and a top surface 22t of the back portion of peg layer 22. A front end of the heat sink adjoins a back side of gap layer 18. A bottom heat sink is employed to compensate for main pole 14 heating caused by proximity of the main pole 14 to the hybrid NFT 20 and the elevated peg layer temperatures during write processes. The heat sink is preferably made of a high thermal conductivity material such as Au, Cu, Cr, Ti, Ta, Ru, Pt, Pd, and SiC and typically extends a greater distance from the ABS 4-4 than back sides 21e, 22e of the NFT 20. In some embodiments, there may be side heat sinks (not shown) on the sides of the main pole and in contact with bottom heat sink 19.

In some embodiments, an adhesion layer is inserted between the resonator body layer 21 and the back portion 22b of the peg layer to form a self-aligned hybrid NFT 20 having a stack of three layers. In some embodiments, a top surface of the adhesion layer contacts a bottom surface of the peg layer, and a bottom surface of the adhesion layer adjoins the top surface 21t of the resonator body layer 21. In some embodiments, the adhesion layer comprises Ta, Zr, Y, Ir, or another element or alloy that binds well to both of the underlying and overlying layers 21, 22, respectively, thereby improving adhesion in the NFT structure and minimizing any tendency for delamination within the NFT during mechanical stress events, or at elevated temperatures which are achieved during write processes.

A method of forming the self-aligned hybrid NFT in a TAMR head is also disclosed herein. In some embodiments, the method includes providing a self-aligned hybrid NFT in a TAMR head. In some embodiments, the peg 22a is formed with a single grain with the desired (111) orientation by determining the effective current Ieff at 100% (defined as the maximum laser diode current—threshold current) for optimal areal density capability (ADC) performance under typical TAMR writing conditions when testing the TAMR head on a spin stand with a TAMR disk, PMR disk, or glass disk. Below its threshold current, a diode laser emits LED light with spontaneous emission only. At the threshold current and above, it begins to generate laser light, and the optical output power rises steeply with increasing diode operating current. The correlation between the optical output power and the diode current is linear up to the maximum power.

In some embodiments, the effective current Ieff under normal operation (100%) includes optimizing both TPI and BPI for optimal ADC performance in spin stand. As discussed previously, the term areal density capability (ADC) may refer to a product of a number of data tracks on a disc (e.g., tracks per inch (TPI)) and a number of data bits along each data rack (e.g., bits per inch (BPI)). TPI and BPI values selected to achieve a high or optimal ADC while maintaining an acceptable bit error rate (BER). If the BER becomes too high, storage device performance may suffer as error correction and read retry operations are performed.

In some embodiments, after determining the effective current Ieff (100%) for optimal areal density capability (ADC) performance under typical TAMR writing conditions, self-annealing is performed by applying an overdriven Ieff in the range of 120% to 210% for 0.1 to 20 seconds to the peg 22a at passive flight by turning off heater and writer current. Without being bound by any particular theory, by increasing Ieff to a higher level (120% to 210%) from the operation Ieff (100%) normally used in TAMR writing, the peg 22a (e.g., an Rh peg) can reach a much higher temperature, such as 400-700° C., than the temperature (300-400° C.) normally reached during TAMR writing. This temperature range allows for peg grain growth and recrystallization to occur quickly (e.g., 0.1 to 60 seconds) to form a single peg (Rh) grain with the desired (111) orientation. For example, by precisely controlling temperature by overdriving Ieff to 138% and self-annealing for 10 seconds, a single peg (Rh) grain with the desired (111) orientation can be formed as shown in FIG. 3B.

In some embodiments, self-annealing is performed by applying an overdriven Ieff at 120% for 10 to 60 seconds. In some embodiments, self-annealing is performed by applying an overdriven Ieff at 130% for 5 to 30 seconds. In some embodiments, self-annealing is performed by applying an overdriven Ieff at 150% for 0.1 to 10 seconds. No subsequent writing process with laser power cycling (e.g., cycling through high and low laser power) is required to form the single peg (Rh) grain with the desired (111) orientation can be formed as shown in FIG. 3B. In some embodiments, self-annealing as described herein only needs to be performed once to form the single peg (Rh) grain with the desired (111) orientation as shown in FIG. 3B.

In some embodiments, self-annealing is a smart laser self-annealing process (SLSA). Self-annealing by SLSA allows for heating to be locally confined to the peg region and all other regions would have a much lower temperature than the peg 22a, thereby pre-conditioning the peg 22a to form a single (Rh) peg grain with the desired (111) orientation for enhanced reliability. More specifically, no MP corrosion and no bottom resonator body layer (e.g., Au) recession are observed in a SLSA process even under stressful conditions like 175% Ieff +10 minutes as confirmed by ABS SEM and x-sec TEM, thereby confirming that heat is locally confined to the peg region during self-annealing by SLSA.

The overdriven Ieff applied is not over 210%, in which peg temperature could be overdriven to more than 700° C. Peg deformation (rounding and/or recession) occurs very quickly, which indicates drastic peg grain growth and fast recrystallization under such high temperature. As such, it is difficult to control peg grain growth precisely under very high temperatures and short time durations in spin stand. By lowering Ieff to 120% to 210%, peg grain growth (such as Rh peg grain growth) can be well-controlled without peg deformation.

In some embodiments, the method further includes confirming ADC performance of the TAMR head by determining again the effective current Ieff at 100% for optimal ADC performance under typical TAMR writing conditions when testing the TAMR head on a spin stand with a TAMR disk, PMR disk, or glass disk.

In some embodiments, providing a self-aligned near field transducer in a TAMR head includes providing a substrate comprising a leading shield and dielectric layer with coplanar top surfaces. A front end of the leading shield is at the ABS 4-4 while a back end thereof adjoins a front side of the dielectric layer. Blocker 25 is formed on a top surface of the leading shield by a conventional method. In some embodiments, thereafter, a bottom cladding layer is deposited by an atomic layer deposition (ALD) method on blocker back side 25e to give sloped section 15s, and on the dielectric layer. Waveguide core 10 is formed on the bottom cladding layer by a fabrication process well known to those skilled in the art. A first chemical mechanical planarization (CMP) process may be performed to give a top waveguide surface that is coplanar with a top surface of sloped section 15s.

In some embodiments, a top cladding layer, which can be made of alumina, is then formed on waveguide core 10 and has a front side at the ABS. In some embodiments, a first adhesion layer is then deposited on the top cladding layer, after which resonator body layer 21 is deposited on the first adhesion layer and has a front side at the ABS 4-4. Note the ABS at this point has not been formed yet and plane 4-4 indicates its eventual position after a back end lapping process.

In some embodiments, a bilayer photoresist having a top layer and a bottom layer is coated on resonator body layer 21 and then patterned to give a substantially rectangular shape where front side 50f is recessed a step length b from ABS 4-4. In some embodiments, the top layer may have a greater cross-sectional area in the x-y plane than the bottom layer to facilitate removal during a subsequent step.

In some embodiments, ion beam etching (IBE) is performed to remove portions of the resonator body layer 21 and the underlying first adhesion layer that are not protected by the photoresist layers. In some embodiments, the photoresist layer is then stripped by a conventional method to give a resonator body front face 21f that is recessed a step length b from the ABS 4-4. A substantial portion of top cladding layer top surface is now exposed.

In some embodiments, a gap layer 17 (composed of, for example $SiO_2$) is deposited on the resonator body layer 21 and on top cladding layer top surface by a plasma enhanced chemical vapor deposition (PECVD) process. However, other gap layers such as alumina or the like may be employed instead of $SiO_2$ for the first gap layer 17. In some embodiments, a second CMP process may be performed thereafter to form a resonator body top surface 21t that is coplanar with a top surface of the first gap layer 17. It should be understood that the thickness t1 of the resonator body layer 21 is set at this point in the fabrication sequence.

In some embodiments, an optional second adhesion layer made of Ta, for example, the peg layer 22, a carbon hard mask, and a hard mask layer (composed of, for example, Ta) are sequentially deposited on the first gap layer 17 and resonator body layer 21. In some embodiments, a sputter deposition system is used to lay down the second adhesion layer, peg layer, and hard mask layers that extend from the ABS toward a back end of the TAMR device. In some embodiments, the carbon hard mask layer has a thickness of about 2000 Angstroms and the Ta hard mask layer is about 150 Angstroms thick. The second adhesion layer has a thickness from about 5 to 30 Angstroms.

In some embodiments, a photoresist is coated and patterned on the first hard mask layer such that a center plane bisects the photoresist layer. The cross-sectional width of the patterned photoresist layer defines the eventual peg layer width at the ABS. In some embodiments, a reactive ion etch (RIE) process is performed to remove regions of the first hard mask layer that are not protected by photoresist layer, and stops on carbon hard mask layer to expose a portion of top surface of the carbon hard mask layer. A back side of the first hard mask layer is at a distance greater than b from the ABS.

In some embodiments, after the photoresist layer is removed and a second hard mask layer is deposited (composed of, for example, Ta) on the first hard mask layer by a lift off method which gives a top-down shape that is essentially the same as the that of the back portion 22b of peg layer and resonator body layer 21 to be formed in a subsequent step. The lift off method comprises coating a photoresist layer (not shown) and patterning the photoresist to form an opening therein in the desired shape of the peg layer back portion from a top-down view. In some embodiments, thereafter, the second hard mask layer is deposited to fill the opening. In some embodiments, a conventional lift off step involving a chemical solution is performed next to remove the photoresist layer and any of the second hard mask layer on a top surface of the photoresist layer. The lift off process also provides a back side having cross-track width, and sides that converge at a front side which is a step length b from the ABS 4-4. Preferably, the second hard mask layer is bisected by a center plane. In some embodiments, the back side of the second hard mask layer is a greater distance from the ABS than the back side of the first hard mask layer.

In some embodiments, a front side of the second hard mask layer is recessed a step length b from the ABS. A back portion of the second hard mask layer may adjoin a back side of the first hard mask layer.

In some embodiments, a RIE process is performed to remove unprotected regions of the carbon hard mask layer. In other words, the shape of the first and second hard masks are transferred to the carbon hard mask, and the etch process stops on the peg layer 22. In some embodiments, an IBE etch is then employed to transfer the carbon hard mask pattern through unprotected regions of the peg layer 22, second adhesion layer, and resonator body layer 21 thereby defining the sides 21s, 22s, ends 21e, 22e shown in FIG. 1. In some embodiments, the IBE process removes the first and second hard masks. Since the shape of the resonator body layer, second adhesion layer, and the back portion of peg layer are determined simultaneously by the aforementioned IBE step, this method is called a self-aligned process.

In some embodiments, the remaining portion of the carbon hard mask is selectively removed by a RIE process that does not substantially etch into any of the other layers in the NFT structure.

In some embodiments, a third gap layer is deposited by a PECVD method and another CMP process is performed to form a top third gap layer surface that is coplanar with a top surface 22t of the peg layer 22. In some embodiments, the third gap layer comprises $SiO_2$, however, any suitable material known in the art can be used. In some embodiments, a different dielectric material such as alumina is used for the third gap layer. In some embodiments, a third adhesion layer made of one of the materials in the second adhesion layer, for example, is deposited on the sidewalls of the first gap layer, peg layer, and second adhesion layer before the third gap layer is deposited. The third adhesion layer may be advantageous in promoting better adhesion between the NFT layers and the first gap layer 17, and in enabling a different wetting angle compliant (top-down) shape for NFT layers.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A near field transducer (NFT) formed between a main pole layer and a waveguide in a thermally assisted magnetic recording (TAMR) head wherein waveguide light excites a NFT resonant mode that propagates to an air bearing surface (ABS) and is coupled to a magnetic medium to facilitate a write process, the NFT comprises:
   (a) a resonator body layer made of a first metal or alloy with a plasmonic character and having a first thickness (t1) in a down-track direction wherein the NFT resonant mode is excited, the resonator body layer has a front side having a first cross-track width at a first plane that is recessed a first distance from the ABS; and
   (b) a peg layer having a second thickness (t2) in a down-track direction wherefrom the NFT resonant mode is coupled to the magnetic medium, the peg layer is a single layer comprising a single material that is a noble metal or alloy thereof and is different from the first metal or alloy and comprises:

a peg portion or peg with a front side at the ABS, the peg portion or the peg having a single peg grain with or without a desired (111) orientation, a back side at the first plane, and two sides aligned orthogonal to the ABS and separated by the first cross-track width.

2. The near field transducer of claim 1 wherein the first cross-track width of the peg is from about 10 to 50 nm.

3. The near field transducer of claim 1 wherein the first distance is from about 10 to 40 nm.

4. The near field transducer of claim 1 wherein the first thickness is a down-track thickness of about 30-70 nm, and the second thickness is a down-track thickness of about 15-45 nm.

5. The near field transducer of claim 1 wherein the resonator body layer is a metal that is Au, Ag, Cu, or an alloy thereof.

6. The near field transducer of claim 1 wherein the peg layer is a noble metal that is Rh, Ir, Ru, Pd, Pt, or an alloy thereof.

7. The near field transducer of claim 1 wherein the resonator body layer further includes a back side with a second cross-track width greater than the first cross-track width at a second plane formed parallel to the ABS and first plane, and two sides connecting the front and back sides wherein the two sides are separated by an increasing cross-track distance with increasing distance from the first plane to the back side.

8. The near field transducer of claim 1 wherein the peg layer further includes a back portion of the peg layer having a front side with the first cross-track width and adjoining the peg at the first plane; a back side having the second cross-track width at the second plane, and two sides connecting the front and back sides, the two sides of the back peg layer portion are aligned above the two resonator body layer sides in a self-aligned NFT structure having a thickness (t1+t2) between a top surface of the peg layer and a bottom surface of the resonator body layer wherein the top surface of the peg layer faces a leading side of the main pole layer, and the bottom surface of the resonator body layer faces the waveguide, and wherein the peg layer top surface is a planar surface formed on the back portion and on the peg portion.

9. A thermally assisted magnetic recording (TAMR) head wherein waveguide light excites a resonant mode in a near field transducer (NFT) of claim 1 that propagates to an air bearing surface (ABS) and is coupled to a magnetic medium to facilitate a write process, comprising:
  (a) a main pole layer having a front side at the ABS and a bottom surface that is a leading side during the write process;
  (b) a waveguide having a top surface facing the main pole layer and wherein light from a laser diode is propagated toward the ABS, and with a front side that faces the ABS;
  (c) the near field transducer that is formed between the main pole layer and the waveguide at the ABS;
  (d) a blocker comprising a metal formed between a front side of the waveguide and the ABS, the blocker prevents waveguide light not coupled to the NFT from reaching the ABS, wherein the blocker has a back side with a maximum distance from the ABS that is less than a distance of the front side of the waveguide from the ABS; and
  (e) a dielectric layer between the blocker back side and the waveguide front side.

10. The TAMR head of claim 9 wherein the self-aligned NFT structure further comprises a first adhesion layer having a bottom surface contacting a top surface of the resonator body layer, and a top surface adjoining a bottom surface of the peg layer, the first adhesion layer has a shape from a top-down (down-track) view essentially the same as that of the overlying peg layer such that a front end of a first section at the ABS has the first cross-track width, and a back end of a second section at the second plane has the second cross-track width.

11. The TAMR head of claim 9 wherein the first cross-track width of the peg is from about 10 to 50 nm.

12. The TAMR head of claim 9 wherein the first distance is from about 10 to 40 nm.

13. The TAMR head of claim 9 wherein the first thickness is a down-track thickness of about 30-70 nm, and the second thickness is a down-track thickness of about 15-45 nm.

14. The TAMR head of claim 9 wherein the resonator body layer is a metal that is Au, Ag, Cu, or an alloy thereof.

15. The TAMR head of claim 9 wherein the peg layer is a noble metal that is Rh, Ir, Ru, Pd, Pt, or an alloy thereof.

16. The TAMR head of claim 9 wherein the blocker is made of Rh, TiN, Ru, NiFe, or FeCo.

17. A method of fabricating the near field transducer in the TAMR head of claim 9, comprising:
  providing a near field transducer in a TAMR head;
  determining the effective current Ieff at 100% for optimal ADC performance of the TAMR head on a spin stand with a TAMR disk, PMR disk, or glass disk; and
  self-annealing the peg portion or the peg by applying an overdriven Ieff in the range of 120% to 210% for 0.1 to 60 seconds to the peg at passive flight to form a single peg grain with a desired (111) orientation.

18. The method of claim 17 further comprising confirming ADC performance of the TAMR head after self-annealing the peg.

19. The method of claim 17 wherein self-annealing includes a smart laser self-annealing process (SLSA).

20. The method of claim 17 wherein providing the near field transducer in the TAMR head includes:
  (a) forming the waveguide on a bottom cladding layer, and facing the blocker having a front side at the air bearing surface (ABS) and a back side adjoining a first gap layer that separates the blocker and waveguide;
  (b) sequentially depositing a first adhesion layer and the resonator body layer portion of the near field transducer (NFT) on the first gap layer and waveguide;
  (c) patterning the resonator body layer to form the front side thereof that is recessed the first distance from the ABS;
  (d) sequentially forming a second adhesion layer, the peg layer portion of the NFT, and then a hard mask comprising a lower carbon layer and an upper first hard mask layer on the resonator body layer and a surrounding oxide layer;
  (e) patterning the first hard mask to form a rectangular shape having a first cross-track width that will define a first cross-track width in a peg portion of the NFT peg layer in a later step;
  (f) patterning a second hard mask on the first hard mask, the second hard mask pattern defines a top-down shape that is subsequently etch transferred into the peg layer portion, second adhesion layer, and resonator body layer, the top-down shape has a back side formed parallel to the ABS, and two sides separated by a greater cross-track distance with increasing distance from the ABS;
  (g) performing a first reactive ion etch to remove unprotected portions of the carbon hard mask, and then an ion beam etch to remove unprotected portions of the second adhesion layer and resonator body layer, and thereby defining the sides of the peg layer, second adhesion layer, and resonator body layer in a self-aligned process, and removing the remaining portions of the first and second hard masks; and (h) performing a second reactive ion etch to remove the remaining portion of carbon hard mask.

* * * * *